United States Patent [19] [11] 4,405,352
Bloss et al. [45] Sep. 20, 1983

[54] METHOD OF MELTING GLASS ON MOLTEN METAL ALLOYS

[75] Inventors: Karl H. Bloss, Pittsburgh; Royann L. Stewart, Natrona Heights, both of Pa.

[73] Assignee: PPG Industries, Inc., Pittsburgh, Pa.

[21] Appl. No.: 344,460

[22] Filed: Feb. 1, 1982

[51] Int. Cl.³ ............................................. C03B 18/18
[52] U.S. Cl. ..................................... 65/99.4; 65/99.2; 65/182.3
[58] Field of Search ...................... 65/99.2, 99.3, 99.4, 65/99.5, 182.3, 182.4

[56] References Cited
U.S. PATENT DOCUMENTS

| | | |
|---|---|---|
| 710,357 | 9/1902 | Heal . |
| 3,127,261 | 3/1964 | Long . |
| 3,305,337 | 2/1967 | Loukes et al. . |
| 3,330,637 | 7/1967 | Loukes et al. ........................ 65/99.4 |
| 3,337,323 | 8/1967 | Loukes et al. . |
| 3,450,516 | 6/1969 | Emhiser et al. . |
| 3,607,179 | 9/1971 | Loukes et al. . |
| 3,764,287 | 10/1973 | Brocious . |
| 3,954,432 | 5/1976 | Hummel et al. . |

*Primary Examiner*—Arthur D. Kellogg
*Attorney, Agent, or Firm*—Dennis G. Millman

[57] ABSTRACT

When using a copper-containing molten metal support upon which glass is melted, diffusion of copper into the melting glass is inhibited by including in the molten metal an element less noble than copper at the melter temperature. The element may be silicon, aluminum, boron, magnesium, manganese, molybdenum, iron, or cobalt.

5 Claims, No Drawings

METHOD OF MELTING GLASS ON MOLTEN METAL ALLOYS

BACKGROUND OF THE INVENTION

This invention relates to melting of glassmaking batch materials on a molten metal support, in particular, on molten copper alloys.

In a conventional glass melting process, glass batch materials are deposited onto a pool of molten glass where they float on the surface. Heat for melting is usually provided by overhead flames and, therefore, the great majority of heat for melting is imparted to the batch materials from the upper side only, which is relatively inefficient. Limits on the thermal durability of the roof of such a melting furnace restricts the amount of thermal input to the furnace and, thus, can limit the throughput of the furnace.

For these reasons, it has been proposed that glass be melted on a molten metal support wherein the high thermal conductivity of the molten metal would provide greater amounts of thermal energy to the underside of the batch layer and thereby provide a more efficient process. A molten metal support for melting is also advantageous for the sake of reducing the area of contact between the molten glass and ceramic containment elements which can contaminate the glass. Another advantage of melting on a molten metal support is that the glass melt may be maintained as a relatively thin layer rather than the deep pool maintained in a conventional tank type glass furnace. As a result, the furance may be reduced in size, less energy is consumed in maintaining the smaller volume of glass in a molten state, and color changes are made easier. Examples of molten metal supports for melting glass may be found in U.S. Pat. Nos. 3,450,516 (Emhiser et al.) and 3,764,287 (Brocious). The former discloses tin, gold or silver as the molten support, and the latter discloses the use of tin.

Gold and silver are obviously economically impractical to employ as molten metal supports in large scale commercial glass melting operations, but an element that is less expensive than tin and which possesses advantages over tin is copper. Potentially, copper could be less reactive to the glass compared to tin because of the lower reducing potential of copper. Also, the higher boiling point of copper entails a lower vapor pressure at a given temperature compared to tin at the same temperature. However, a major drawback of copper is its strong tendency to color glass. Cupric ions yield blue colored glass, and cuprous ions result in the development or ruby red coloration upon subsequent heat treatment. It would be desirable to control the coloration effects of copper so that molten copper could be used as a support for melting glass.

The use of copper alloyed with tin or other metals has been suggested for use as the molten metal support in the float process wherein molten glass is delivered onto a pool of molten metal and spreads to form a flat sheet, e.g., U.S. Pat. No. 710,357 (Heal). The temperatures involved in the float process, however, are considerably lower than those required for melting glass, and thus, infusion of unwanted coloring elements into the glass is less of a concern in the float process than in a melting process. In addition to higher temperatures a melting operation involves localized concentrations of alkalinity that promote chemical activity of the support metal. For these reasons, molten copper is considerably more difficult to employ as a support in a melting environment than in a float environment. Furthermore, for float forming, major proportions of copper are not employed because of its high melting temperature.

U.S. Pat. No. 3,127,261 (Long) discloses the use of a molten copper-containing alloy as a heat transfer medium for cooling molten glass in a conditioning section of a glass melter downstream from the melting zone.

In U.S. Pat. No. 3,670,179 (Loukes et al.), glass forming elements are reacted within a molten metal pool that may include copper alloys so as to synthesize a glass. The glass synthesis method is carried out at temperatures below those required for fusion melting of glass.

Preventing migration of tin into a glass ribbon being formed in a float process by incorporating trace amounts of various elements into the molten is disclosed in U.S. Pat. Nos. 3,305,337 (Loukes et al.); 3,337,323 (Loukes et al.); and 3,954,432 (Hummel et al.).

SUMMARY OF THE INVENTION

In the present invention, incorporation of cuprous or cupric ions into glass during melting thereof, while supported on a molten metal support including copper, is inhibited by incorporating into the molten copper-containing support a minor amount of an element less noble than copper at the melting conditions. The less noble element is sacrificially oxidized rather than the copper, thereby helping to maintain the copper in the elemental state, in which state it is not prone to migrate into the melting glass. The sacrificial elements include silicon, aluminum, magnesium, boron, manganese, molybdenum, iron, and cobalt.

This invention pertains to operations in which glass is being melted, as opposed to being formed. Melting may be characterized by exchange of heat from the molten metal substrate to the melting glass materials. With conventional flat glass compositions, a temperature above about 2000° F. (1100° C.) would be characteristic of a melting operation. The presence of unmelted glass batch materials in substantial amounts is also indicative of a melting process. In a melting process as characterized above, the invention is applicable to any copper-containing molten metal alloy, including those in which copper is not the major constituent. However, an alloy which is predominantly copper and, therefore, by virtue of its melting temperature restricted to use in melting processes, is a particularly suitable application for the present invention.

DETAILED DESCRIPTION OF THE INVENTION

The present invention relates to the manufacture of clear glass and to any colored glass which does not intentionally include substantial amounts of copper. The invention is not limited to particular glass compositions but it is contemplated that a major application will be for melting soda-silica glasses, and references herein to specific glass properties relate to conventional flat glass compositions.

Since $Cu^+$ has the same charge and almost the same ionic radius as $Na^+$, the relatively great mobility of $Na^+$ in silicate glasses and some refractories is nearly duplicated by $Cu^+$. Thus, to minimize copper incorporation into the glass and refractories, it is necessary to prevent $Cu^+$ from accumulating in a copper-containing molten substrate. Although the mobility of $Cu^{++}$ is not as great, a portion of $Cu^{++}$ is converted to $Cu^+$ in the presence of metallic copper and, therefore, any mode of oxidation of the copper should be kept at a minimum.

The object of the present invention is to sacrifice a less noble metal to intercept and possibly reverse the formation of the fast diffusing $Cu^+$. It should be understood that the term "less noble" applies at the temperature of operation, where the standard order of nobility may not apply. In Table I, there are listed the proposed sacrificial elements in ascending order of nobility at two selected temperatures. These relative nobilities were determined by calculating reaction probabilities for the formation of the designated oxides which were then compared with the probability of $Cu_2O$ formation. The "preferred alloy ratio" in Table I is the ratio of the sacrificial element to copper which would theoretically reduce copper migration into the glass to 1 percent of that from pure copper under the same assumed ideal conditions. Of course, satisfactory performance need not require reduction to the 1 percent level, and satisfactory performance may be obtained for a given application with less of the sacrificial element. Additionally, it should be noted that estimated interpolation between the two temperatures reported in Table I may be required for specific operating temperatures. For many glass compositions, 1300° K. is lower than would be desired for melting, and 2000° K. is above the temperature to which most glass melts are heated. But the data of Table I are useful for estimating alloy ratios at melting temperatures lying between the reported extremes.

TABLE I

| Temperature (°K.) | Element | Most Probable Oxide | Preferred Alloy Ratio Element:Cu |
|---|---|---|---|
| 1300 | Si | $SiO_2$ | $7.43 \cdot 10^{-21}$ |
|  | Al | $Al_2O_3$ | $1.80 \cdot 10^{-20}$ |
|  | Mg | MgO | $4.73 \cdot 10^{-15}$ |
|  | B | $B_2O_3$ | $3.18 \cdot 10^{-14}$ |
|  | Mn | MnO | $2.70 \cdot 10^{-8}$ |
|  | Mo | $MoO_2$ | $5.24 \cdot 10^{-8}$ |
|  | Fe | FeO | $3.26 \cdot 10^{-4}$ |
|  | Sn | SnO | $1.09 \cdot 10^{-2}$ |
|  | Co | CoO | $1.73 \cdot 10^{-1}$ |
| 2000 | Si | $SiO_2$ | $4.61 \cdot 10^{-12}$ |
|  | Al | $Al_2O_3$ | $1.05 \cdot 10^{-11}$ |
|  | B | $B_2O_3$ | $1.13 \cdot 10^{-8}$ |
|  | Mg | MgO | $4.56 \cdot 10^{-7}$ |
|  | Mn | MnO | $1.02 \cdot 10^{-4}$ |
|  | Mo | $MoO_2$ | $3.82 \cdot 10^{-4}$ |
|  | Fe | FeO | $1.42 \cdot 10^{-2}$ |
|  | Co | CoO | $8.47 \cdot 10^{-1}$ |

Other considerations enter the selection of a sacrificial alloy in addition to its relative activity. Silicon and aluminum, although highest in activity, may be undesirable for some applications due to their strong reducing effect on molten glass. On the other hand, tin and cobalt are only marginally effective and at higher temperatures, tin is not effective to prevent oxidation of copper. Economics are also a factor to be considered, in which case the use of iron is a preferred embodiment in spite of its relatively low activity. Some of the sacrificial element in its oxide form will become incorporated into the molten glass and its effect on the glass should be considered in selecting the sacrificial element. Incorporation of small amounts of iron oxide into the glass is not a drawback in most cases and, therefore, iron is a preferred embodiment for this reason as well.

Because the object of the invention is to avoid oxidation of copper, it is contemplated that heat for melting would preferably be provided by electric heating means rather than by combustion so as to avoid oxidizing conditions within the melter. A suitable arrangement for carrying out the melting process of the present invention is disclosed in the aforementioned U.S. Pat. No. 3,450,516 (Emhiser et al.).

It should be understood that other variations and modifications as are known to those of skill in the art are included within the scope of the invention as defined by the claims which follow.

We claim:

1. A method of melting glass comprising: feeding a glass batch of particulate oxygen containing materials onto the surface of a pool of molten metal, the molten metal including a substantial amount of copper; heating the batch materials on the molten metal to melt the batch materials to form a molten glass layer floating on the molten metal; and maintaining in the molten metal of the pool a concentration of an additional element selected from the group consisting of silicon, aluminum, magnesium, boron, manganese, molybdenum, iron, and cobalt sufficient to inhibit oxidation of copper.

2. The method of claim 1 wherein the additional element is iron.

3. The method of claim 1 wherein the molten metal is predominantly copper.

4. The method of claim 1 wherein the molten metal is maintained at a temperature above 2000° F.

5. The method of claim 1 wherein raw, unmelted glassmaking ingredients are continuously deposited onto the molten metal pool, and a layer of at least partly melted glassy material is continuously withdrawn from the molten metal pool.

* * * * *